(No Model.) 2 Sheets—Sheet 1.

G. D. HAWORTH.
FERTILIZER DISTRIBUTER.

No. 535,006. Patented Mar. 5, 1895.

ATTEST
Helen Graham
William Graham

INVENTOR
G. D. HAWORTH.
by his attorney
L. P. Graham (No Model.) 2 Sheets—Sheet 2.

G. D. HAWORTH.
FERTILIZER DISTRIBUTER.

No. 535,006. Patented Mar. 5, 1895.

ATTEST
Helen Graham
William Graham

INVENTOR
G. D. HAWORTH
by his attorney
L. P. Graham

UNITED STATES PATENT OFFICE.

GEORGE D. HAWORTH, OF DECATUR, ILLINOIS.

FERTILIZER-DISTRIBUTER.

SPECIFICATION forming part of Letters Patent No. 535,006, dated March 5, 1895.

Application filed June 11, 1894. Serial No. 514,181. (No model.)

*To all whom it may concern:*

Be it known that I, GEORGE D. HAWORTH, of Decatur, in the county of Macon and State of Illinois, have invented certain new and useful Improvements in Fertilizer-Distributers, of which the following is a specification.

This invention relates to a fertilizer distributer attachment for corn planters. It is exemplified in the structure hereinafter described, and it is defined in the appended claims.

Figure 7:
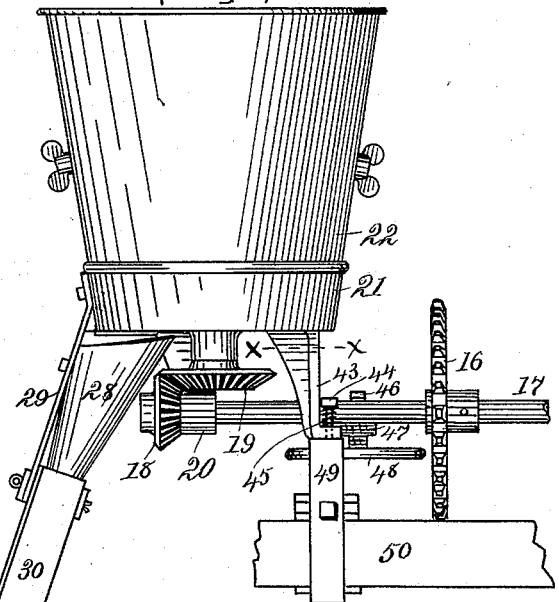
Figure 8:
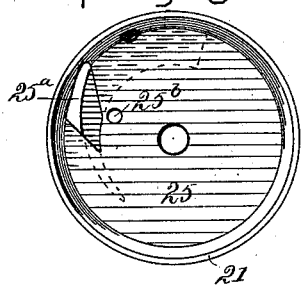
Figure 9:
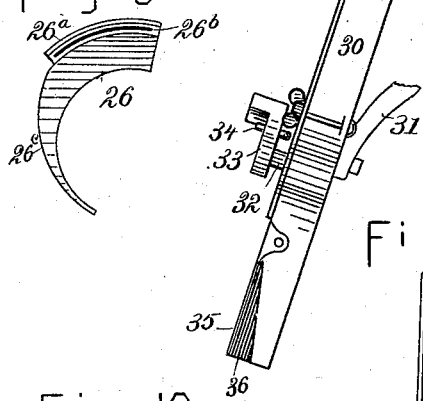
Figure 12:
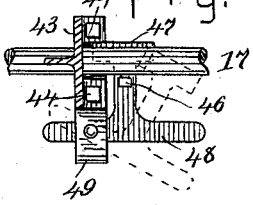
Figure 11:
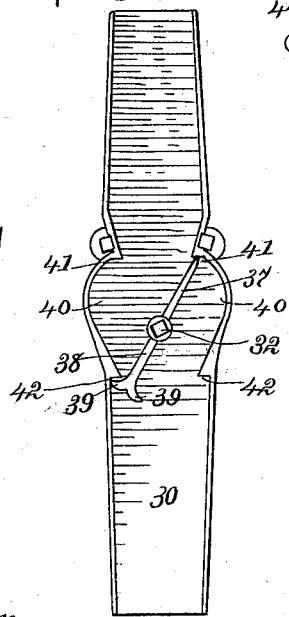
Figure 10:
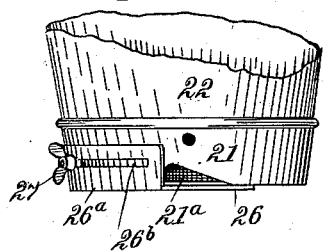
Figure 13:
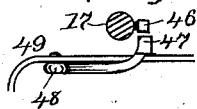

In the drawings forming part of this specification Figure 1 is a plan of one side of the front frame of a corn planter, with the fertilizer distributer attached thereto. Fig. 2 is a plan of the cut-off of the fertilizer hopper. Fig. 3 is a plan of the discharge disk of the hopper. Fig. 4 is a central vertical section through the discharge disk. Fig. 5 is an oblique projection of the discharge disk, showing the same inverted. Fig. 6 is a vertical section through a part of the discharge disk and the bottom of the hopper, exemplifying on an enlarged scale a peculiarity of the invention that will be hereinafter pointed out. Fig. 7 is a rear elevation of the fertilizer distributer. Fig. 8 is a plan of the bottom of the hopper, showing the discharge openings thereof and indicating the form of the gage used to regulate the quantity discharged. Fig. 9 is a plan of the gage. Fig. 10 is an elevation of the lower end of the fertilizer hopper, showing the side configuration of the discharge opening and the slotted flange of the gage. Fig. 11 is an elevation of the lower end of the chute of the hopper, one side being removed to expose the dropping valve and show the form of the chamber in which such valve operates. Fig. 12 is a plan of jarring mechanism used at times to prevent the fertilizing compound from packing in the hopper, and said plan is taken from section line X in Fig. 7. Fig. 13 is a side view of details of the jarring mechanism.

The seed box of the planter is shown at 1, the runner at 2 and the shake bar at 3. The sprocket wheel 4 is driven from a planter wheel and it is fixed on an end of shaft 5. Head 6 is fixed on the opposite end of shaft 5 and has at one end an oblique bore. Lever 7 pivots at one end in the oblique bore of head 6 and at the opposite end in a similar bore in sprocket wheel 12. It rocks vertically on bearings 10 and 11, on lever 8, and also rocks horizontally, with lever 8, on pin 9. The pin rises from bracket 54 which is secured to cross bar 14 of the planter. Bracket 13, also attached to cross bar 14, has a horizontal pin on which wheel 12 rotates. Chain 15 connects wheel 12 with sprocket wheel 16, which is fixed on shaft 17 of the fertilizer distributer. Lever 8 is adapted to actuate the shake bar 3, as indicated in Fig. 1, whenever the planter is used to drill the corn; but in planting in check rows the connection between the lever and the bar is broken, and the planting is done by the customary check row mechanism.

The above described mechanism provides means for imparting motion to the shaft of the fertilizer distributer. It is desirable for the reason that it will also act as a drill attachment, but it is not essential to the distribution of the fertilizer, which requires only that the shaft 17 may be driven by some adequate mechanism. The movement, so far as it applies to the drilling action of the planter, is described in Letters Patent No. 402,669, granted to me on the 7th day of May, 1889, and the present novelty resides in the sprocket wheel 12, which is in line with shaft 5, and in the extension of lever 7 and its engagement with the sprocket wheel.

The shaft 17 journals in hanger 20, depending from the hopper, and it is provided with bevel pinion 18 which meshes with gear wheel 19. The wheel 19 journals in bearings in the bottom of the hopper, and it is bored to receive the shaft 23$^d$ of the discharge disk 23, and grooved to admit the pins of the shaft and provide a connection that will cause the disk to rotate with the wheel and at the same time permit ready removal of the disk. The disk is formed with an annular, peripheral rim, which rests on the bottom of the hopper, and it has the radial feed fingers 23$^a$, which extend somewhat above the bottom of the rim of the disk. Scraper 23$^b$ is, throughout the greater part of its length, flush with the bottom of the rim, but its lower surface, immediately adjoining the rim is cut away, or grooved, as shown at 23$^g$ in Fig. 6. The scraper 23$^b$ extends outward something near one half the length of the feed fingers, and scraper 23$^c$, formed on an end of a finger at a point about opposite scraper 23ᵇ, extends from the end of the finger inward to a distance equaling about one half the length of the finger, and its lower surface is flush with the bottom of the rim.

As the discharge disk is rotated by the gearing the fingers force the fertilizing material, with which the hopper is supplied, under the cut-off 24 and out of the discharge opening in the bottom of the hopper. The fingers move freely through the fertilizing material, out of contact with the bottom of the hopper, and the material is prevented from packing, injuriously, on the bottom of the hopper by the scrapers 23ᵇ and 23ᶜ. As the material is frequently very finely pulverized special provision is required to prevent it from working under the disk, and this is made by the groove 23ᵍ in scraper 23ᵇ, which permits a narrow ridge of the material to pack closely around the space between the disk and the bottom of the hopper and thereby exclude the looser, moving material. If, while the ridge is forming, or at other times, the material should force its way under the disk, it will be received in the cavity thereof, without possibility of raising the disk, and any considerable accumulation will be forced by scrapers 23ᵉ and 23ᶠ through a specially provided hole in the bottom of the hopper.

The cut off, 24, is pointed, as at 24ᵃ and has the share conformation 24ᵇ, in order that it may better part the fertilizing material. It is also preferably provided with projections 24ᶜ, which extend through holes in the side of the hopper and secure the cut-off firmly in position. The bridge extension of the cut-off traverses the hopper diametrically, acting as a partial support for the fertilizing material and providing means for steadying the discharge disk from above.

The bottom 25 has the rim 21, with which the sheet metal hopper is connected. It is provided with a principal discharge outlet, substantially as shown in Fig. 8 at 25ᵃ, and also has the secondary opening 25ᵇ to permit the discharge of any material that may, by any chance, find its way under the disk. The opening in the bottom is extended upward in the rim 21, as shown at 21ᵃ in Fig. 10, and the fertilizing material is in part forced horizontally through the side opening and in part permitted to fall through the bottom opening. The gage 26, which is used to vary the size of the bottom opening, has an inner concentric edge, an outer concentric rim 26ᵃ, which conforms to the rim of the bottom and is slotted longitudinally at 26ᵇ, and its outer, or gage, edge describes a curve about equal to the curvature of the rim but drawn from a different center. A bolt extends from the hopper through the slot of the gage rim, and a nut 27 on the bolt provides means for holding the gage in any desired position. The gage is adjusted by sliding its rim around the hopper, moving it bodily to and from the discharge opening, but such is the effect of the peculiar shape of the gage edge that the opening is enlarged or diminished in substantially the same manner as if the motion were radial instead of circumferential.

As the fertilizing material is forced from the hopper it falls into the upper, or funnel, end 28 of chute 30, in which it is temporarily arrested by the valve shown in Fig. 11 and permitted to escape simultaneous with the dropping action of the seed plates of the planter. The ends of valve chamber 40 are contracted, as compared with the general capacity of the chute, while its body is enlarged. The upper parts of its sides are internally concave, and the lower parts incline convergingly downward. The stem 32, on which the valve pivots, is somewhat below the center of the chamber and the valve wings 37 and 38 extend upward and downward respectively from opposite sides of the pivot. The upper end of wing 37 rests, ordinarily, under a ledge 41, formed by the upper contraction of the valve chamber, and the lower wing has lateral extensions, 39, one or the other of which rests under a ledge 42, formed by the lower contraction of the chamber.

Upwardly extending, weighted arm 33 is secured to the outer end of the valve pivot. Rod 34 extends from the arm to L lever 51, connected with the bottom of the seed box and the shake bar has a tooth 53, which engages a notch in the end of the L lever and provides means for imparting the motion of the shake bar to the arm of the valve. The chute is supported in part by strap 29, which connects with the hopper, and in part by bracket 31 which connects with some accessible part of the planter structure. The lower end of the chute flap 35 is spread away from the chute in the rear thereof, in order that the driver of the machine may see the passage of the fertilizing material just previous to its reaching the ground.

As the material falls from the hopper it is intercepted by the valve, which lies diagonally across the chamber, and accumulates against the valve until the shake bar moves, when the lower end of the valve will swing open, the upper end will force the material contained in the chamber around the curved side and out of the chamber while the valve will assume the proper position to receive material in the opposite side of the chamber. In order to get this result effectively under all circumstances, it is necessary that the chamber should be enlarged considerably beyond the contraction of its mouth, in order to provide space for clearance, and it is very desirable that the sides should curve somewhat as shown, in order that they may act as inclines to divert the side pressure of the valve downward. The weighted arm 33 is intended to compel the valve to complete its throw, in case the motion of the shake bar should fall short of its purpose, but, to provide for all emergencies, the valve has sufficient motion to carry the upper end under a ledge 41, and an extension 39 under a ledge 42 even though the throw should not be complete.

It is apparent that the upper end of the valve is in a good operative position whenever it has reached the side of the mouth of the chamber, but it may not so readily be seen that the lower end will retain the fertilizing material when not entirely closed. The explanation is this: When the lower end of the valve is nearly, but not quite closed the openings under the ledge, around the end of the lateral extension and downward past the same is too zig zag for the cohesive substance to follow.

The same reason that enables the valve to hold the fertilizing material when not entirely closed, makes it necessary to provide against possible packing of the material in the hopper above the influence of the feed fingers, and this provision is shown in Figs. 7, 12 and 13 where 49 is a support carried by the cross bar, 50 of the planter frame, 43 is a bracket resting on the support and carrying the hopper, 44 are bolts extending through holes in feet of the bracket and connecting with the support, 45 are springs between the heads of the bolts and the feet of the bracket, 46 is a stud projecting from the shaft 17 of the fertilizer hopper, 47 is a head adapted to impede the motion of the stud of the shaft, and 48 is the swinging body to which the head is attached. When the head is in position to jar the hopper it rests on support 49 in the path of the stud and when the stud strikes it the hopper is raised, against the pressure of springs 45, until sufficient clearance is made to permit further rotation, and as soon as the impediment is passed the springs snap the hopper down against the support with a force amply sufficient to neutralize all tendency of the material to pack in the hopper. This is to provide for unusually sticky material, and is not always needed. When it is not desired the body 48 is swung on the pivot that connects it with support bar 49, as indicated in broken lines in Fig. 12, and the head is carried out of the path of the stud. In this connection I will state that I am aware that a jarring motion has been given to hoppers heretofore for the purpose of distributing the seed contained therein but in this case the jarring mechanism operates with expelling mechanism to accomplish a different result.

Each hopper is supplied with independent jarring mechanism, and each chute is open sufficiently to enable the driver to see whether or not the fertilizer is discharging freely and uniformly. The machine is run ordinarily with the jarring mechanism inoperative, i. e., out of gear, and either or both hoppers are given a jarring motion whenever the driver sees, through the openings in the chutes, that such motion is necessary to proper discharge of the fertilizer. The foot of the driver is employed to throw the jarring mechanism in and out of operation, and the general result is that the energy necessary to jar the hoppers is expended only when needed.

Throughout the specification reference has been made to but one hopper and distributing mechanism, but it is to be understood that each seed box is to be supplied with a fertilizer hopper and adjuncts, the same as described, and that the shaft 17 actuates the discharge disks of both while the dropping devices are impelled by the shake bar.

Having thus described my invention, I claim as new and desire to secure by Letters Patent—

1. A discharge disk for the hoppers of fertilizer distributers, such disk having radial feed fingers extended above the bottom bearing of the disk, a scraper extending outward from the disk about one half the length of a feed finger, and another scraper extending inward from an end of a finger about the same distance, the scrapers being flush with the bottom bearing of the disk, substantially as set forth.

2. In a fertilizer distributer, a hopper having a discharge opening through one side of its bottom, and a gage for the opening circumferentially adjustable on the hopper and having an elongated gage edge, whereby the circumferential adjustment of the gage contracts or enlarges the opening in a substantially radial direction, substantially as set forth.

3. A chute for fertilizer distributers having an enlarged valve chamber with contracted inlet and outlet and concaved sides, and a valve pivoted centrally in the chamber and provided with lateral extensions at its lower end, whereby the valve closes with its ends under ledges formed by the contraction of the openings, and acts positively to expel the fertilizer from the chamber, substantially as set forth.

4. A chute for fertilizer distributers comprising a valve chamber having ledges at its upper end and also at its lower end, and a valve swung in the chamber in such manner that its upper end passes under ledges in act of closing, such valve having lateral extensions at its lower end adapted to swing under the lower ledges, substantially as set forth.

5. A chute for fertilizer distributers, having a swinging valve provided with lateral extensions at its lower end, and also having ledges at the lower end of the valve chamber, under which the lateral extensions of the valve swing in closing, substantially as set forth.

6. The combination with the valve of the fertilizer chute and the shake bar of the planter, of the arm on the stem of the valve, the L lever adapted to be actuated by the shake bar, and the rod connecting the L lever with the arm of the valve, substantially as set forth.

7. In a fertilizer distributer for planters, the combination of a hopper, a discharge chute for the hopper having an opening through which passage of the fertilizer may be observed, and jarring mechanism for the hopper adapted to be operated from the planter and to be thrown in and out of operation, substantially as set forth.

8. In a fertilizer distributer for planters the combination of two or more hoppers, a shaft adapted to actuate the discharge mechanism of all the hoppers, and independent jarring mechanism for each hopper adapted to be operated from the shaft and to be thrown independently in and out of action, substantially as set forth.

9. In a fertilizer distributer for planters, the combination of the hopper shaft 17, having a stud, as 46, and a swinging body, as 48, having a head, as 47, adapted to be swung into and out of the path of the stud of the shaft, substantially as set forth.

10. A cut-off plate for the discharge disks of fertilizer distributers, such cut-off plate being located at one side of the hopper and having a bridge bar extending across the hopper above the discharge disk, in position to steady the disk and form a partial support for the fertilizing material, substantially as set forth.

11. Drive mechanism for fertilizer distributers, comprising a rotating head, a wheel axially in line with the head, and a lever swung on a universal pivot between the wheel and the head and having an end in engagement with each, substantially as set forth.

In testimony whereof I sign my name in the presence of two subscribing witnesses.

GEO. D. HAWORTH.

Attest:
D. A. STRADER,
THEO. COLEMAN.